US012739831B2

(12) United States Patent
Zeng et al.

(10) Patent No.: US 12,739,831 B2
(45) Date of Patent: Sep. 15, 2026

(54) DYNAMIC HARQ-ACK CODEBOOK PROCESSING METHOD AND APPARATUS, DEVICE, AND READABLE STORAGE MEDIUM

(71) Applicant: VIVO MOBILE COMMUNICATION CO., LTD., Guangdong (CN)

(72) Inventors: Chaojun Zeng, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 271 days.

(21) Appl. No.: 18/507,624

(22) Filed: Nov. 13, 2023

(65) Prior Publication Data

US 2024/0080840 A1 Mar. 7, 2024

Related U.S. Application Data

(63) Continuation of application No. PCT/CN2022/091461, filed on May 7, 2022.

(30) Foreign Application Priority Data

May 11, 2021 (CN) ......................... 202110510949.6

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 1/1861* (2013.01); *H04W 72/0446* (2013.01); *H04W 72/232* (2023.01)

(58) Field of Classification Search
CPC ......... H04W 72/1273; H04W 72/0446; H04W 72/232; H04L 1/1812; H04L 1/1896;
(Continued)

(56) References Cited

U.S. PATENT DOCUMENTS 11,882,571 B2 * 1/2024 Bae ........................ H04L 5/0032
2018/0241510 A1 8/2018 Shen
(Continued)

FOREIGN PATENT DOCUMENTS

CN 108292974 A 7/2018
CN 110351837 A 10/2019
(Continued)

OTHER PUBLICATIONS

First Office Action for Chinese Application No. 202110510949.6, dated Aug. 4, 2023, 8 Pages.
(Continued)

*Primary Examiner* — Shah M Rahman
(74) *Attorney, Agent, or Firm* — BROOKS KUSHMAN P.C.

(57) ABSTRACT

A dynamic HARQ-ACK codebook processing method and apparatus, a device, and a readable storage medium. The HARQ-ACK codebook processing method includes: in a case that at least one of scheduled PDSCHs is unable to be transmitted, determining, by a terminal, a mapping relationship between HARQ-ACK bits in a dynamic HARQ-ACK codebook and the scheduled PDSCHs based on one or more of a DAI counting manner and whether time-domain bundling is used.

20 Claims, 4 Drawing Sheets

201

In a case that at least one of scheduled PDSCHs is unable to be transmitted, a terminal determine a mapping relationship between HARQ-ACK bits in a dynamic HARQ-ACK codebook and the scheduled PDSCHs based on one or more of a DAI counting manner and whether time-domain bundling is used

(51) Int. Cl.

| | |
|---|---|
| ***H04L 1/1829*** | (2023.01) |
| ***H04W 72/0446*** | (2023.01) |
| ***H04W 72/232*** | (2023.01) |

(58) Field of Classification Search

CPC ... H04L 1/1861; H04L 5/0055; H04L 1/1854; H04L 1/0023; H04L 5/0053

See application file for complete search history.

(56) References Cited

U.S. PATENT DOCUMENTS

| | | | | |
|---|---|---|---|---|
| 2018/0278373 | A1 | 9/2018 | Wang et al. | |
| 2019/0313342 | A1* | 10/2019 | Papasakellariou .. | H04W 52/325 |
| 2021/0051671 | A1 | 2/2021 | Myung et al. | |
| 2021/0084622 | A1 | 3/2021 | Choi et al. | |
| 2022/0007399 | A1* | 1/2022 | Rastegardoost ...... | H04L 1/1861 |
| 2022/0239445 | A1* | 7/2022 | Yoshioka .............. | H04W 72/23 |
| 2022/0248436 | A1* | 8/2022 | Zhang ............... | H04W 72/1273 |
| 2022/0256586 | A1 | 8/2022 | Zeng et al. | |
| 2022/0271873 | A1* | 8/2022 | Gao ...................... | H04L 1/1854 |
| 2022/0330297 | A1* | 10/2022 | Lei ........................ | H04L 1/1812 |
| 2023/0038293 | A1 | 2/2023 | Liu et al. | |
| 2023/0076459 | A1* | 3/2023 | Si ...................... | H04W 72/1273 |
| 2023/0239082 | A1* | 7/2023 | Choi ..................... | H04L 5/0055 |
| 2023/0344570 | A1* | 10/2023 | Jung ..................... | H04L 1/1671 |
| 2024/0080856 | A1* | 3/2024 | Wang .................... | H04L 1/1854 |
| 2024/0171319 | A1* | 5/2024 | Yin ....................... | H04W 72/56 |
| 2024/0243855 | A1* | 7/2024 | Bhamri ................. | H04L 1/1887 |

FOREIGN PATENT DOCUMENTS

| | | | | | |
|---|---|---|---|---|---|
| CN | 110677222 | A | | 1/2020 | |
| CN | 111277388 | A | | 6/2020 | |
| CN | 111865506 | A | | 10/2020 | |
| CN | 111901886 | A | | 11/2020 | |
| CN | 112217620 | A | | 1/2021 | |
| CN | 113132073 | B | * | 11/2024 | .......... H04L 1/1854 |
| WO | 2019139908 | A1 | | 7/2019 | |
| WO | 2020194459 | A1 | | 10/2020 | |
| WO | 2021033116 | A1 | | 2/2021 | |

OTHER PUBLICATIONS

CATT “UE feedback enhancements for HARQ-ACK” 3GPP TSG RAN WG1 #103-e, e-Meeting, Oct. 2020, R1-2007849, 7 Pages.

International Search Report and Written Opinion for Application No. PCT /CN2022/091461, dated Jul. 28, 2022, 8 Pages.

Moderator (LG Electronics) “Summary #4 of PDSCH/PUSCH enhancements (Scheduling/HARQ)” 3GPP TSG RAN WG1 #104-e, e-Meeting, Jan. 2021, R1-2102080, 43 Pages.

Vivo “Remaining issues on PDSCH PUSCH enhancements for NR operation from 52.6GHz to 71GHz” 3GPP TSG RAN WG1 #10 7-e, e-Meeting, Nov. 2021, R1 2111002, 21 Pages.

European Search Report for Application No. 22806649.4, mailed Oct. 11, 2024, 9 pages.

First Japanese Office Action for Japanese Patent Application No. 2023-569855 mailed Jan. 7, 2025. 15 pages.

Huawei, HiSilicon. Discussion on SPS HARQ-ACK bit handling in case of dynamic codebook configuration for eCA. 3GPP TSG RAN WGI Meeting #84bis. RI-162105. Online. Apr. 2016. 5 pages.

Huawei, HiSilicon. Feature Summary of Enhancements on Multi-TRP/Panel Transmission. 3GPP TSG RAN WGI Meeting #98bis. RI-1911425. Online. Oct. 2019. 100 pages.

First Indian Office Action for Indian Patent Application No. 202317079587 mailed Apr. 20, 2026. 5 pages.

* cited by examiner

201

In a case that at least one of scheduled PDSCHs is unable to be transmitted, a terminal determine a mapping relationship between HARQ-ACK bits in a dynamic HARQ-ACK codebook and the scheduled PDSCHs based on one or more of a DAI counting manner and whether time-domain bundling is used 301
In a case that at least one of scheduled PDSCHs is unable to be transmitted, a network-side device determines a mapping relationship between HARQ-ACK bits in a dynamic HARQ-ACK codebook and the scheduled PDSCHs based on one or more of a DAI counting manner and whether time-domain bundling is used
FIG. 3
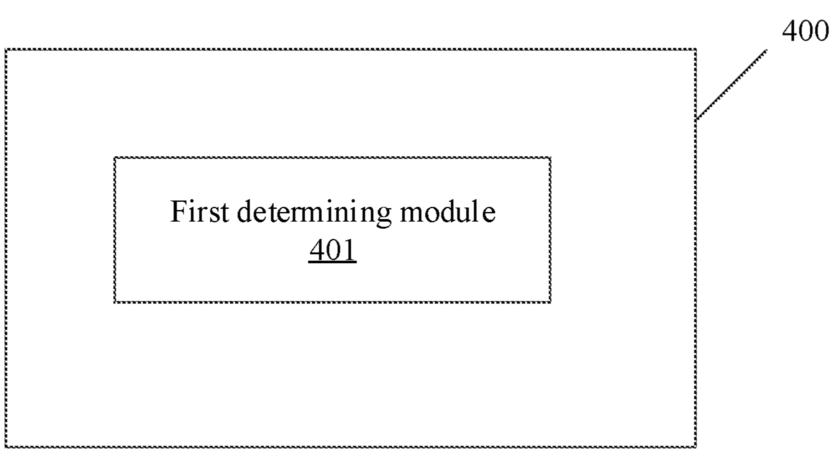
FIG. 4
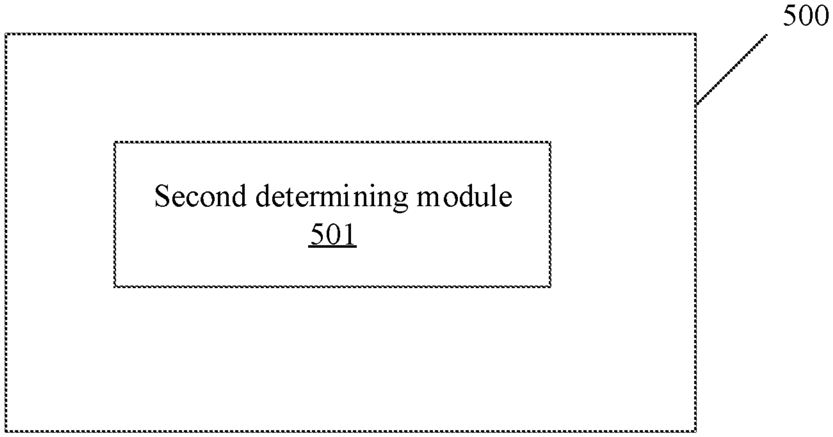
FIG. 5

DYNAMIC HARQ-ACK CODEBOOK PROCESSING METHOD AND APPARATUS, DEVICE, AND READABLE STORAGE MEDIUM

CROSS-REFERENCE TO RELATED APPLICATIONS

This application is a continuation of International Application No. PCT/CN2022/091461 filed on May 7, 2022, which claims priority to Chinese Patent Application No. 202110510949.6, filed on May 11, 2021, which are incorporated herein by reference in their entireties.

TECHNICAL FIELD

This application pertains to the field of communications technologies, and specifically relates to a dynamic hybrid automatic repeat request acknowledgement (HARQ-ACK) codebook processing method and apparatus, a device, and a readable storage medium.

BACKGROUND

During multi-physical downlink shared channel (PDSCH) scheduling, when at least one PDSCH in one or more PDSCHs scheduled by a single piece of downlink control information (DCI) cannot be actually transmitted (for example, when there is a conflict with a semi-static uplink symbol (Semi-static UL symbol)), downlink assignment indexes (Downlink Assignment Index, DAI) counting/indication and setting of HARQ-ACK bits are affected for the dynamic HARQ-ACK codebook. Therefore, how to set HARQ-ACK bits of the dynamic HARQ-ACK codebook is a problem to be urgently resolved.

SUMMARY

According to a first aspect, a dynamic HARQ-ACK codebook processing method includes: in a case that at least one of scheduled PDSCHs is unable to be transmitted, determining, by a terminal, a mapping relationship between HARQ-ACK bits in a dynamic HARQ-ACK codebook and the scheduled PDSCHs based on one or more of a DAI counting manner and whether time-domain bundling is used.

According to a second aspect, a dynamic HARQ-ACK codebook processing method includes: in a case that at least one of scheduled PDSCHs is unable to be transmitted, determining, by a network-side device, a mapping relationship between HARQ-ACK bits in a dynamic HARQ-ACK codebook and the scheduled PDSCHs based on one or more of a DAI counting manner and whether time-domain bundling is used.

According to a third aspect, a dynamic HARQ-ACK codebook processing apparatus is provided, applied to a terminal and including:

- a first determining module, configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used.

According to a fourth aspect, a dynamic HARQ-ACK codebook processing apparatus is provided, applied to a network-side device and including:

- a second determining module, configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used.

According to a fifth aspect, a terminal is provided, including a processor, a memory, and a program stored in the memory and capable of running on the processor. When the program is executed by the processor, the steps of the method according to the first aspect are implemented.

According to a sixth aspect, a terminal is provided, including a processor and a communication interface, where the processor is configured to perform the steps of the method according to the first aspect.

According to a seventh aspect, a network-side device is provided, including a memory, a processor, and a program stored in the memory and capable of running on the processor. When the program is executed by the processor, the steps of the method according to the second aspect are implemented.

According to an eighth aspect, a network-side device is provided, including a processor and a communication interface, where the processor is configured to perform the steps of the method according to the second aspect.

According to a ninth aspect, a readable storage medium is provided, where a program or instructions are stored in the readable storage medium, and when the program or the instructions are executed by a processor, the steps of the method according to the first aspect or the second aspect are implemented.

According to a tenth aspect, a computer program/program product is provided, where the computer program/program product is stored in a storage medium, and the computer program/program product is executed by at least one processor to implement the steps of the processing method according to the first aspect or the second aspect.

According to an eleventh aspect, a chip is provided, where the chip includes a processor and a communication interface, the communication interface is coupled to the processor, and the processor is configured to run a program or instructions to implement the processing method according to the first aspect or the second aspect.

BRIEF DESCRIPTION OF DRAWINGS

FIG. 3 is a second schematic diagram of a dynamic HARQ-ACK codebook processing method according to an embodiment of this application;

FIG. 4 is a first schematic diagram of a dynamic HARQ-ACK codebook processing apparatus according to an embodiment of this application;

FIG. 5 is a second schematic diagram of a dynamic HARQ-ACK codebook processing apparatus according to an embodiment of this application;

DETAILED DESCRIPTION

Figures 1, 2:
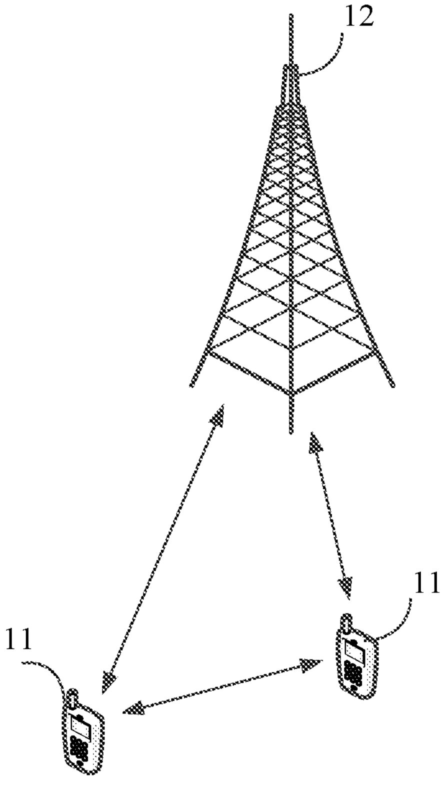
FIG. 1 is a schematic diagram of a wireless communication system to which the embodiments of this application are applicable.
FIG. 2 is a first schematic diagram of a dynamic HARQ-ACK codebook processing method according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

For ease of understanding the embodiments of this application, the following technical points are first described.

1. Multi-PDSCH Scheduling in Release 17 (Rel-17)

During research on 52.6-71 GHz features in Rel-17, it has been determined that new subcarrier spacings (Sub-Carrier Space, SCS) including 480 kHz and 960 kHz need to be introduced for new bands deployed for new radio (NR). For the newly introduced SCSs, physical downlink control channel (PDCCH) monitoring needs to be adjusted or enhanced accordingly, for example, to prevent the terminal (for example, user equipment (UE)) from monitoring the PDCCH in every slot (which is a very short duration), thereby reducing complexity of UE implementation. Correspondingly, to fully utilize time domain resources of carriers, multi-PDSCH scheduling and multi-PUSCH scheduling need to be developed or introduced.

Multi-PDSCH scheduling means that a single piece of DCI can schedule multiple PDSCH transmissions on the same carrier at one time. According to specification of NR protocols, these PDSCHs do not overlap in time domain.

2. HARQ-ACK Dynamic Codebook in Release 15 (Rel-15)

During organization of a HARQ-ACK bit sequence that needs to be reported at a specific feedback moment, UE determines a correspondence between each downlink PDSCH transmission and a specific bit in the organized HARQ-ACK bit sequence according to a preset rule and based on a scheduling status of single-/multi-carrier uplink and downlink PDSCH transmissions for which HARQ-ACKs need to be reported at the feedback moment, and such operation is referred to as HARQ-ACK codebook construction or HARQ-ACK codebook scheme. In NR Rel-15, two HARQ-ACK codebook schemes are used: semi-static codebook (Type-1) and dynamic codebook (Type-2).

For the dynamic codebook, feedback bits are reserved for each actually used DAI value through DAI counting for actually scheduled PDSCH transmissions/semi-persistent scheduling (SPS) PDSCH release indications. If the UE infers, based on other DAIs detected, that PDSCH assignment indications or SPS PDSCH release indications corresponding to some DAIs have not been received, corresponding feedback bits are set to negative acknowledgement (NACK); otherwise, a corresponding feedback bit is set based on a decoding result of a PDSCH transmission corresponding to each PDSCH assignment indication, and a corresponding feedback bit of a detected SPS PDSCH release indication is set to acknowledgement (ACK).

The DAI is indicated by using a limited number of bits (currently, a single DAI generally occupies 2 bits). In order to expand its indication range, a modulo operation is introduced, that is, to start counting sequentially from 1, and then take the modulo to obtain a DAI value corresponding to a count value.

3. HARQ-ACK Dynamic Codebook in Rel-17

When multi-PDSCH scheduling is supported, the HARQ-ACK dynamic codebook needs to be enhanced accordingly to support HARQ-ACK feedback corresponding to multi-PDSCH scheduling.

4. Time-Domain Bundling for HARQ-ACK Feedback

Time-domain bundling for HARQ-ACK feedback can be understood as bundling on decoding results of PDSCHs received at different moments (generally using a binary AND operation) to form a single fused decoding result to reduce feedback bits. The bundling mechanism for HARQ-ACK feedback has been used in long term evolution (LTE) time division duplexing (TDD) mode.

During research on 52.6-71 GHz features in Rel-17, in discussion over HARQ-ACK feedback based on dynamic codebook for multi-PDSCH scheduling, a company has proposed use of the time-domain bundling mechanism, and the main proposals made so far include: performing time-domain bundling within a range of one to multiple PDSCHs scheduled by a single piece of DCI, or performing grouping of one to multiple PDSCHs scheduled by a single piece of DCI and then performing time-domain bundling within a PDSCH range corresponding to a single PDSCH group.

5. Terms in this Specification:

Scheduled PDSCH: indicates a PDSCH in one or more PDSCHs scheduled by a single piece of DCI, which may be a valid PDSCH or an invalid PDSCH.

Valid PDSCH: indicates a specific PDSCH in one or more PDSCHs scheduled by a single piece of DCI that does not have a conflict with a semi-static UL symbol, which may be understood as a scheduled PDSCH that can be actually transmitted.

Invalid PDSCH: indicates a specific PDSCH in one or more PDSCHs scheduled by a single piece of DCI that has a conflict with a semi-static UL symbol, which may be understood as a scheduled PDSCH that cannot be actually transmitted.

Referring to FIG. 1, FIG. 1 is a block diagram of a wireless communication system to which the embodiments of this application are applicable. The wireless communication system includes a terminal 11 and a network-side device 12. The terminal 11 may also be referred to as a terminal device or user equipment, and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a specific type of the terminal 11 is not limited in the embodiments of this application.

The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a Wi-Fi node, a transmission and reception Point (Transmitting Receiving Point, TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

Referring to FIG. 2, an embodiment of this application provides a dynamic HARQ-ACK codebook processing method, and specific steps include step 201.

Step 201: In a case that at least one of scheduled PDSCHs is unable to be transmitted, a terminal determine a mapping relationship between HARQ-ACK bits in a dynamic HARQ-ACK codebook and the scheduled PDSCHs based on one or more of a DAI counting manner and whether time-domain bundling is used.

The case with presence of the scheduled PDSCHs being unable to be transmitted is equivalent to that the scheduled PDSCHs may be unable to be transmitted. For example, a PDSCH cannot be actually transmitted due to a conflict with a semi-static uplink symbol (that is, at least one of symbols occupied by the PDSCH has been semi-statically configured as an uplink symbol) or due to other cases.

The scheduled PDSCHs include: valid PDSCH(s) or invalid PDSCH(s).

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that the DAI counting manner includes performing DAI counting for each downlink control information DCI and time-domain bundling is not used, mapping the valid PDSCH(s) to HARQ-ACK bits in the dynamic HARQ-ACK codebook, or mapping all of the scheduled PDSCHs to HARQ-ACK bits in the dynamic HARQ-ACK codebook.

In an implementation of this application, the time-domain bundling manner includes one of the following:

(1) including invalid PDSCH(s) into an operation range of the time-domain bundling; and (2) excluding the invalid PDSCH(s) from the operation range of the time-domain bundling.

In an implementation of this application, a granularity or range of the time-domain bundling includes one of the following:

(1) a PDSCH set scheduled by DCI; and (2) PDSCH subsets in the PDSCH set scheduled by DCI.

In an implementation of this application, in a case that the granularity or range of the time-domain bundling includes the PDSCH set scheduled by DCI, the PDSCH set is classified in one of the following manners:

(1) regarding all the scheduled PDSCHs as a PDSCH set; and (2) regarding all the valid PDSCHs as a PDSCH set.

In an implementation of this application, in a case that the granularity or range of the time-domain bundling includes PDSCH subsets in the PDSCH set scheduled by DCI, the method further includes:

determining the number of PDSCH subsets based on a size of a PDSCH subset;

or, determining a size of a PDSCH subset based on the number of PDSCH subsets.

In an implementation of this application, in a case that the granularity or range of the time-domain bundling includes the PDSCH subsets in the PDSCH set scheduled by DCI, the method further includes:

determining a mapping relationship between the scheduled PDSCHs or valid PDSCHs and the PDSCH subsets.

In an implementation of this application, the mapping relationship includes any one of the following:

the 1st scheduled PDSCH or the 1st valid PDSCH corresponds to the 1st PDSCH in the 1st PDSCH subset, and remaining scheduled PDSCHs or remaining valid PDSCHs sequentially correspond to a current PDSCH subset or to a PDSCH subset after the current PDSCH subset; and the last scheduled PDSCH or the last valid PDSCH corresponds to the last PDSCH in the last PDSCH subset, and remaining scheduled PDSCHs or remaining valid PDSCHs sequentially correspond to a current PDSCH subset or to a PDSCH subset before the current PDSCH subset.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that time-domain bundling is not used and the invalid PDSCH is not included into the DAI counting, skipping mapping the invalid PDSCH to the HARQ-ACK bits in the dynamic HARQ-ACK codebook; or, in a case that time-domain bundling is not used and the invalid PDSCH is included into the DAI counting, mapping the invalid PDSCH to the HARQ-ACK bits in the dynamic HARQ-ACK codebook.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that time-domain bundling is used and the DAI counting manner includes inclusion of the invalid PDSCH into the DAI counting, including the invalid PDSCH into the operation range of the time-domain bundling, or excluding the invalid PDSCH from the operation range of the time-domain bundling.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, the DAI counting manner includes no inclusion of an invalid PDSCH group into the DAI counting and that time-domain bundling is not used, skipping mapping the invalid PDSCH group in the PDSCH groups to the HARQ-ACK bits in the dynamic HARQ-ACK codebook; or, in a case that, for division of the scheduled PDSCHs into PDSCH groups, the DAI counting manner includes inclusion of an invalid PDSCH group into the DAI counting and that time-domain bundling is not used, mapping an invalid PDSCH group in the PDSCH groups to the HARQ-ACK bits in the dynamic HARQ-ACK codebook; where the HARQ-ACK bits are set to negative acknowledgement NACK.

Scheduled PDSCHs corresponding to the invalid PDSCH group are all invalid PDSCHs.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, the DAI counting manner includes performing DAI counting for each PDSCH group scheduled by a single piece of DCI, that a valid PDSCH group in the PDSCH groups includes an invalid PDSCH, and that time-domain bundling is not used, mapping the invalid PDSCH in the valid PDSCH group to the HARQ-ACK bits in the dynamic HARQ-ACK codebook; where the HARQ-ACK bits are set to NACK; where at least one scheduled PDSCH corresponding to the valid PDSCH group is a valid PDSCH.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, time-domain bundling is used and the DAI counting manner includes inclusion of an invalid PDSCH group into the DAI counting, mapping an invalid PDSCH group in the PDSCH groups to the HARQ-ACK bits in the dynamic HARQ-ACK codebook; where the HARQ-ACK bits are set to NACK.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, the DAI counting manner includes performing DAI counting for each PDSCH group scheduled by a single piece of DCI, and that time-domain bundling is used, including an invalid PDSCH in a valid PDSCH group in the PDSCH groups into the operation range of the time-domain bundling, or excluding an invalid PDSCH in a valid PDSCH group in the PDSCH groups from the operation range of the time-domain bundling.

In an implementation of this application, the method further includes:

receiving, by the terminal, a DAI indication from a network-side device; where the DAI indication includes any one of the following:

(1) the network-side device does not include the invalid PDSCH into the DAI counting;

(2) the network-side device includes the invalid PDSCH into the DAI counting;

(3) the network-side device does not include a PDSCH group into the DAI counting; and (4) the network-side device includes a PDSCH group into the DAI counting.

In a case that, for division of the scheduled PDSCHs into PDSCH groups or for division of valid PDSCHs into PDSCH groups, the PDSCH group includes a maximum of M scheduled PDSCHs with consecutive numbers or indexes or includes a maximum of adjacent valid PDSCHs in the M scheduled PDSCHs, M being greater than or equal to 1.

In an implementation of this application, in a case that the granularity or range of the time-domain bundling includes the PDSCH subsets in the PDSCH set scheduled by DCI, the PDSCH subset includes a maximum of N scheduled PDSCHs with consecutive numbers or indexes or includes a maximum of adjacent valid PDSCHs in the N scheduled PDSCHs; where N is equal to M, or M is an integer multiple of N, or N is an integer multiple of M.

In this embodiment of this application, in the case that the scheduled PDSCH cannot be actually transmitted, consistent understanding on the HARQ-ACK bits in the dynamic HARQ-ACK codebook between the terminal and the network-side device can be ensured, thereby ensuring reliability of downlink data transmission.

Referring to FIG. 3, an embodiment of this application provides a dynamic HARQ-ACK codebook processing method, and specific steps include step 301.

Step 301: In a case that at least one of scheduled PDSCHs is unable to be transmitted, a network-side device determines a mapping relationship between HARQ-ACK bits in a dynamic HARQ-ACK codebook and the scheduled PDSCHs based on one or more of a DAI counting manner and whether time-domain bundling is used.

The scheduled PDSCHs include: valid PDSCH(s) or invalid PDSCH(s).

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that the DAI counting manner includes performing DAI counting for each piece of DCI and time-domain bundling is not used, mapping the valid PDSCH(s) to HARQ-ACK bits in the dynamic HARQ-ACK codebook, or mapping all of the scheduled PDSCHs to HARQ-ACK bits in the dynamic HARQ-ACK codebook.

In an implementation of this application, the time-domain bundling manner includes one of the following:

(1) including invalid PDSCH(s) into an operation range of the time-domain bundling; and (2) excluding the invalid PDSCH(s) from the operation range of the time-domain bundling.

In an implementation of this application, a granularity or range of the time-domain bundling includes one of the following:

(1) a PDSCH set scheduled by DCI; and (2) PDSCH subsets in the PDSCH set scheduled by DCI.

In an implementation of this application, in a case that the granularity or range of the time-domain bundling includes the PDSCH set scheduled by DCI, the PDSCH set is classified in one of the following manners:

(1) regarding all the scheduled PDSCHs as a PDSCH set; and (2) regarding all the valid PDSCHs as a PDSCH set.

In an implementation of this application, in a case that the granularity or range of the time-domain bundling includes PDSCH subsets in the PDSCH set scheduled by DCI, the method further includes:

determining the number of PDSCH subsets based on a size of a PDSCH subset; or, determining a size of a PDSCH subset based on the number of PDSCH subsets.

In an implementation of this application, in a case that the granularity or range of the time-domain bundling includes PDSCH subsets in the PDSCH set scheduled by DCI, the method further includes:

determining a mapping relationship between the scheduled PDSCHs or valid PDSCHs and the PDSCH subsets.

In an implementation of this application, the mapping relationship includes any one of the following:

the 1st scheduled PDSCH or the 1st valid PDSCH corresponds to the 1st PDSCH in the 1st PDSCH subset, and remaining scheduled PDSCHs or remaining valid PDSCHs sequentially correspond to a current PDSCH subset or to a PDSCH subset after the current PDSCH subset; and the last scheduled PDSCH or the last valid PDSCH corresponds to the last PDSCH in the last PDSCH subset, and remaining scheduled PDSCHs or remaining valid PDSCHs sequentially correspond to a current PDSCH subset or to a PDSCH subset before the current PDSCH subset.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that time-domain bundling is not used and the invalid PDSCH is not included into the DAI counting, skipping mapping the invalid PDSCH to the HARQ-ACK bits in the dynamic HARQ-ACK codebook;

or, in a case that time-domain bundling is not used and the invalid PDSCH is included into the DAI counting, mapping the invalid PDSCH to the HARQ-ACK bits in the dynamic HARQ-ACK codebook.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that time-domain bundling is used and the DAI counting manner includes inclusion of the invalid PDSCH into the DAI counting, including the invalid PDSCH into the operation range of the time-domain bundling, or excluding the invalid PDSCH from the operation range of the time-domain bundling.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, the DAI counting manner includes no inclusion of an invalid PDSCH group into the DAI counting and that time-domain bundling is not used, skipping mapping the invalid PDSCH group to the HARQ-ACK bits in the dynamic HARQ-ACK codebook;

or, in a case that, for division of the scheduled PDSCHs into PDSCH groups, the DAI counting manner includes inclusion of an invalid PDSCH group into the DAI counting and that time-domain bundling is not used, mapping an invalid PDSCH group to the HARQ-ACK bits in the dynamic HARQ-ACK codebook; where the HARQ-ACK bits are set to negative acknowledgement NACK.

Scheduled PDSCHs corresponding to the invalid PDSCH group are all invalid PDSCHs.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, the DAI counting manner includes performing DAI counting for each PDSCH group scheduled by a single piece of DCI, that a valid PDSCH group in the PDSCH groups includes an invalid PDSCH, and that time-domain bundling is not used, mapping the invalid PDSCH in the valid PDSCH group to the HARQ-ACK bits in the dynamic HARQ-ACK codebook; where the HARQ-ACK bits are set to NACK; where at least one scheduled PDSCH corresponding to the valid PDSCH group is a valid PDSCH.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, time-domain bundling is used and the DAI counting manner includes inclusion of an invalid PDSCH group into the DAI counting, mapping an invalid PDSCH group in the PDSCH groups to the HARQ-ACK bits in the dynamic HARQ-ACK codebook; where the HARQ-ACK bits are set to NACK.

In an implementation of this application, the step of determining a mapping relationship between HARQ-ACK bits in a dynamic HARQ-ACK codebook and the scheduled PDSCHs based on a DAI counting manner and whether time-domain bundling is used includes:

in a case that, for division of the scheduled PDSCHs into PDSCH groups, the DAI counting manner includes performing DAI counting for each PDSCH group scheduled by a single piece of DCI, and that time-domain bundling is used, including an invalid PDSCH in a valid PDSCH group in the PDSCH groups into the operation range of the time-domain bundling, or excluding an invalid PDSCH in a valid PDSCH group in the PDSCH groups from the operation range of the time-domain bundling.

It can be understood that the network-side device may determine a mapping relationship between the HARQ-ACK bits in the dynamic HARQ-ACK codebook and the DCI-scheduled PDSCHs based on a predefined rule.

In an implementation of this application, the network-side device performs DAI counting based on one or more of a DAI counting manner and whether time-domain bundling is used.

In an implementation of this application, the step in which the network-side device performs DAI counting based on a DAI counting manner includes:

in a case that the DAI counting manner includes performing DAI counting for each scheduled PDSCH, excluding, by the network-side device, the invalid PDSCH from the DAI counting, or including the invalid PDSCH(s) into the DAI counting.

In an implementation of this application, the step in which the network-side device performs DAI counting based on a DAI counting manner includes:

in a case that the DAI counting manner includes DAI counting for each piece of DCI-scheduled PDSCH group, excluding, by the network-side device, the PDSCH group from the DAI counting, or including the PDSCH group into the DAI counting.

In a case that, for division of the scheduled PDSCHs into PDSCH groups or for division of valid PDSCHs into PDSCH groups, the PDSCH group includes a maximum of M scheduled PDSCHs with consecutive numbers or indexes or includes a maximum of adjacent valid PDSCHs in the M scheduled PDSCHs, M being greater than or equal to 1.

In an implementation of this application, in a case that the granularity or range of the time-domain bundling includes the PDSCH subsets in the PDSCH set scheduled by DCI, the PDSCH subset includes a maximum of N scheduled PDSCHs with consecutive numbers or indexes or includes a maximum of adjacent valid PDSCHs in the N scheduled PDSCHs; where N is equal to M, or M is an integer multiple of N, or N is an integer multiple of M.

In an implementation of this application, the method further includes:

sending, by the network-side device, a DAI indication to a terminal; where the DAI indication includes any one of the following:

(1) the network-side device does not include the invalid PDSCH into the DAI counting;

(2) the network-side device includes the invalid PDSCH into the DAI counting;

(3) the network-side device does not include a PDSCH group into the DAI counting; and (4) the network-side device includes a PDSCH group into the DAI counting.

In this embodiment of this application, in the case that the scheduled PDSCH cannot be actually transmitted, consistent understanding on the HARQ-ACK bits in the dynamic HARQ-ACK codebook between the terminal and the network-side device can be ensured, thereby ensuring reliability of downlink data transmission.

The following describes the implementations of this application by using the following examples.

For multi-PDSCH scheduling, when a dynamic HARQ-ACK codebook is used, for DAI counting, there are three alternative (Alt) schemes, including Alt scheme 1, Alt scheme 2, and Alt scheme 3. The following provides manners of DAI counting and/or HARQ-ACK bit setting for each Alt scheme in a case that a scheduled PDSCH scheduled by DCI cannot be actually transmitted (for example, there is a conflict between the scheduled PDSCH scheduled by DCI and a semi-static UL symbol).

It should be noted that DAI counting or indication is performed by the network-side device, and the terminal receives a corresponding DAI counting indication (or DAI indication for short) and can determine a status of DCI missing detection based on a DAI counting indication corresponding to actually received DCI.

HARQ-ACK bit setting (including construction of dynamic HARQ-ACK codebook, that is, determining of a HARQ-ACK bit sequence corresponding to the dynamic HARQ-ACK codebook, or determining of a mapping relationship between HARQ-ACK bits and scheduled PDSCHs as well as values of the HARQ-ACK bits) is performed by the terminal, and the network-side device determines, based on a predefined rule, a mapping relationship between HARQ-ACK bits in the dynamic HARQ-ACK codebook and DCI-scheduled PDSCHs, receives a HARQ-ACK bit sequence corresponding to the HARQ-ACK codebook, and reads values of the HARQ-ACK bits.

(1) Alt Scheme 1: DAI Counting for Each Piece of DCI

Generally, it can be assumed that at least one scheduled PDSCH scheduled by each piece of DCI is valid, that is, there is no conflict with a semi-static UL symbol (otherwise, the DCI indication on the network side is meaningless). In this case, if one or some scheduled PDSCHs scheduled by the DCI have a conflict with a semi-static UL symbol, no impact is imposed on DAI counting/indication (for DAI counting/indication, existing understanding/scheme can be still used); however, an impact is imposed on setting of values of HARQ-ACK bits corresponding to DAIs. The following describes impact analysis and a corresponding processing method based on whether time-domain bundling is used.

Example 1-1 (Case 1-1): Time-Domain Bundling is not Used for the Dynamic HARQ-ACK Codebook The number of HARQ-ACK bits corresponding to each piece of DCI/DAI in the dynamic HARQ-ACK codebook (in a case of a single codebook (single codebook)) or in a HARQ-ACK sub-codebook (in a case of a separate sub-codebook) corresponding to multi-PDSCH DCI depends on: the maximum configured number of PDSCHs for multi-PDSCH DCIs across serving cells belonging to the same PUCCH cell group (the maximum configured number of PDSCHs for multi-PDSCH DCI across serving cells belonging to the same PUCCH cell group).

Assuming that a value of the maximum configured number is MAX, for the number of HARQ-ACK bits corresponding to (that is, required to be occupied) MAX PDSCHs that corresponds to each piece of DCI/DAI, which is subsequently referred to as MAX positions (in the dynamic HARQ-ACK codebook or the HARQ-ACK sub-codebook corresponding to multi-PDSCH DCI), each position corresponds to a single PDSCH.

Assuming that S HARQ-ACK bits need to be used for feeding back corresponding HARQ-ACK information for each PDSCH, each of the foregoing positions corresponds to S HARQ-ACK bits, and each piece of DCI/DAI corresponds to MAX×S HARQ-ACK bits.

Assuming that a specific piece of DCI schedules N scheduled PDSCHs, including N1 valid PDSCHs and N2 invalid PDSCHs, either of the following manners (setting manner 2-1 or setting manner 2-2) may be used:

Setting manner 2-1: Only valid PDSCHs are mapped to HARQ-ACK bits in the dynamic HARQ-ACK codebook.

In this case, the N2 valid PDSCHs scheduled by the DCI are mapped one by one in a scheduling order or another predefined order to the beginning or the end N2 positions of the MAX positions corresponding to the DAI corresponding to the DCI. The HARQ-ACK bits corresponding to each of the N2 actually mapped positions in the MAX positions are set based on a decoding result of corresponding invalid PDSCHs as well as configurations of the number of codewords, spatial bundling, or the like; HARQ-ACK bits corresponding to each of (MAX-N2) unmapped positions in the MAX positions are all set to NACK.

The N1 invalid PDSCHs scheduled by the DCI are not mapped to any of the MAX positions.

Setting manner 2-2: All scheduled PDSCHs are mapped to HARQ-ACK bits in the dynamic HARQ-ACK codebook.

In this case, the N scheduled PDSCHs scheduled by the DCI are mapped one by one in a scheduling order or another predefined order to the beginning or the end N positions of the MAX positions corresponding to the DAI corresponding to the DCI. When a specific position in the N actually mapped positions in the MAX positions is mapped to a valid PDSCH, the HARQ-ACK bits corresponding to this position are set based on a decoding result of the corresponding invalid PDSCH as well as configurations of the number of codewords, spatial bundling, and the like. When a specific position is mapped to an invalid PDSCH, the HARQ-ACK bits corresponding to this position are all set to NACK. HARQ-ACK bits corresponding to each of (MAX-N) unmapped positions in the MAX positions are all set to NACK.

Example 1-2 (Case 1-2): Time-Domain Bundling is Used

Time-domain bundling can be understood as performing a binary AND (or binary OR) on a decoding result of a corresponding codeword of two or more PDSCHs to obtain a fused decoding result corresponding to the codeword (that is, decoding results of all the two or more PDSCHs corresponding to the codeword are fused, for example, being expressed by one bit). When two-codeword transmission is configured, each codeword corresponds to its own fused decoding result, and further operations may be performed based on the spatial bundling configuration.

When time-domain binding is used, a specific PDSCH set/subset is used as a bundling group, time-domain binding is performed for PDSCHs in this PDSCH set/subset, and HARQ-ACK bits for the bundling group in a HARQ-ACK codebook are set based on a bundling output.

Based on the above description, it can be seen that a single piece of DCI/DAI may correspond to one or more bundling groups, that is, bundling granularity 1-1 corresponds to a single bundling group, and bundling granularity 1-2 corresponds to one or more bundling groups or may correspond to multiple bundling groups. Each bundling group corresponds to a single feedback position in a dynamic HARQ-ACK codebook or a HARQ-ACK sub-codebook corresponding to multi-PDSCH DCI, and each feedback position corresponds to one or two HARQ-ACK bits based on the codeword configuration.

For a given PDSCH set/subset (used as a bundling group), when at least one invalid PDSCH is present in the PDSCH set/subset, either of the following manners (Bundling manner 1-1 or Bundling manner 1-2) may be used.

Bundling manner 1-1: The invalid PDSCH is included into an operation range of time-domain bundling.

This is equivalent to that each PDSCH in the PDSCH set/subset participates in the time-domain bundling operation. A decoding result corresponding to the invalid PDSCH may be assumed to be NACK or ACK.

Further, to avoid the impact of invalid PDSCHs being unable to be transmitted/received on HARQ-ACK feedback:

(1) when binary AND is used, the decoding result corresponding to the invalid PDSCH may be assumed to be ACK; and (2) when binary OR is used, the decoding result corresponding to the invalid PDSCH may be assumed to be NACK.

Bundling manner 1-2: The invalid PDSCH is excluded from an operation range of time-domain bundling.

Only valid PDSCHs in the PDSCH set/subset participate in the time-domain bundling operation.

For the granularity/range of the time-domain bundling, either of the following granularities (Bundling granularity 1-1 or Bundling granularity 1-2) may be used.

Bundling granularity 1-1: Time-domain bundling is performed within a range of all scheduled PDSCHs scheduled by the DCI.

In this case, either of the following bundling manners (Bundling manner 1 or Bundling manner 2) may be used.

Bundling manner 1: All scheduled PDSCHs scheduled by the DCI are regarded as a PDSCH set.

In this case, the PDSCH set may contain invalid PDSCHs, and either bundling manner 1-1 or bundling manner 1-2 may be used.

Bundling manner 2: All valid PDSCHs scheduled by the DCI are regarded as a PDSCH set.

In this case, for each valid PDSCH in the PDSCH set, the conventional time-domain bundling operation may be used.

Bundling granularity 1-2: Time-domain bundling is performed within a range of a PDSCH subset scheduled by the DCI.

In this case, part of PDSCHs (not always all PDSCHs) in one or more PDSCHs (as a PDSCH set) scheduled by a single piece of DCI may be used as a PDSCH subset. Either of the following manners (granularity manner 1-2-1 or granularity manner 1-2-2) may be used for determining the number of PDSCH subsets scheduled by a single piece of DCI and a size of the PDSCH subsets scheduled by the single piece of DCI.

Granularity manner 1-2-1: Determining the number of PDSCH subsets based on a PDSCH subset size.

Assuming that the PDSCH subset size is known, for example, as specified by the protocol or based on configured by higher-layer signaling, the number of PDSCH subsets=ceiling (MAX/PDSCH subset size). For MAX, see the foregoing description. For the actual PDSCH subset size, either of the following manners (granularity manner 1-2-1-1 or granularity manner 1-2-1-2) may be further used:

granularity manner 1-2-1-1: using the foregoing known PDSCH subset size; and granularity manner 1-2-1-2: determining and using a PDSCH subset size based on the determined number of PDSCH subsets and further with reference to granularity manner 1-2-2.

Granularity manner 1-2-2: Determining a PDSCH subset size based on the number of PDSCH subsets.

Assuming that the number of PDSCH subsets is known, for example, as specified by the protocol or based on configured by higher-layer signaling, either of the following manners (granularity manner 1-2-2-1 or granularity manner 1-2-2-2 or granularity manner 1-2-2-3) may be used for determining the PDSCH subset size:

granularity manner 1-2-2-1: PDSCH subset size=ceiling (MAX/the number of PDSCH subsets). For MAX, see the foregoing description;

granularity manner 1-2-2-2: PDSCH subset size=ceiling (the number of scheduled PDSCHs in the PDSCH set/the number of PDSCH subsets); and granularity manner 1-2-2-3: PDSCH subset size=ceiling (the number of valid PDSCHs in the PDSCH set/the number of PDSCH subsets).

During determining of the actually used PDSCH subset size based on granularity manner 1-2-2-2 or granularity manner 1-2-2-3, in some cases, a smaller actually used PDSCH subset size can be obtained in a case that the number of PDSCH subsets remains unchanged.

For either of the foregoing PDSCH subset-based granularity manners (granularity manner 1-2-1 or granularity manner 1-2-2), each scheduled PDSCH may be mapped to a corresponding PDSCH subset (all manners except granularity manner 1-2-2-3; where granularity manner 1-2-2-3 supports only mapping valid PDSCHs to the corresponding PDSCH subset), or each valid PDSCH may be mapped to a corresponding PDSCH subset (any one of the foregoing manners may be used).

Either of the following manners (mapping manner 1-1 or mapping manner 1-2) may be used for determining a mapping relationship between the scheduled PDSCHs/valid PDSCHs and the PDSCH subsets:

Mapping manner 1-1: The 1st scheduled PDSCH/valid PDSCH corresponds to the 1st PDSCH of the 1st PDSCH subset, and remaining scheduled PDSCHs/valid PDSCHs sequentially correspond to a current or subsequent PDSCH subset.

Mapping manner 1-2: The last scheduled PDSCH/valid PDSCH corresponds to the last PDSCH of the last PDSCH subset, and remaining scheduled PDSCHs/valid PDSCHs sequentially correspond to a current or previous PDSCH subset.

When only valid PDSCHs are considered for mapping, the invalid PDSCHs are actually excluded from division and mapping of PDSCH subsets. When only scheduled PDSCHs are considered for mapping, an invalid PDSCH may be present in scheduled PDSCHs mapped for a specific PDSCH subset, bundling manner 1-1 or bundling manner 1-2 may be used in this case.

When no scheduled PDSCH/valid PDSCH is mapped for a specific PDSCH subset, a time-domain bundling operation does not need to be performed for the PDSCH subset, and HARQ-ACK bits of a bundling group corresponding to a PDSCH subset in the codebook or sub-codebook may be all set to NACK.

It should be noted that for bundling granularity 1-2, the number of PDSCH subsets corresponding to each piece of DCI/DAI can be predicted before the terminal organizes the HARQ-ACK codebook and can be understood consistently between the terminal and the network, where the number of PDSCH subsets herein can also be understood as the number of bundling groups.

(2) Alt Scheme 2: DAI Counting for Each PDSCH

Either of the following manners (counting manner 2-1 or counting manner 2-2) may be used for DAI counting for PDSCHs.

Counting manner 2-1: Invalid PDSCHs are not included into DAI counting.

The counter-downlink assignment index (C-DAI) corresponds to the 1st or last valid PDSCH scheduled by the DCI. The total-downlink assignment index (T-DAI) indicated by the DCI indicates DAI corresponding to the last valid PDSCH that has been scheduled in the current PUCCH cell group and for which HARQ-ACK is fed back in a same UL slot/sub-slot, as of a current PDCCH monitoring occasion (including valid PDSCHs scheduled in each serving cell corresponding to a current PUCCH cell group within the current PDCCH monitoring occasion). When no missing detection of scheduling DCI occurs, for next scheduling DCI for which corresponding HARQ-ACK is fed back in a same UL slot/sub-slot in a same PUCCH cell group of a same terminal, counting needs to be performed continuously based on DAI indicated by the scheduling DCI.

For example, assuming that the PUCCH cell group involves only a single serving cell and the terminal detects that DCI1 schedules three scheduled PDSCHs, of which two are valid PDSCHs, and assuming that a C-DAI indicated in DCI1 is 1, for the 1st valid PDSCH, when no DCI missing detection occurs, the terminal expects that next DCI2 indicates a C-DAI of 3 (that is, the two valid PDSCHs scheduled by DCI1 correspond to DAI=1 and DAI=2, respectively).

Counting manner 2-2: Invalid PDSCHs are included into the DAI counting.

DAI counting is performed for each scheduled PDSCH, regardless of whether it is a valid PDSCH or an invalid PDSCH.

It can be understood that the UE determines a DCI missing detection status based on one of the foregoing counting manners used and constructs a HARQ-ACK codebook accordingly.

The following describes bit setting/processing of the HARQ-ACK codebook based on whether time-domain bundling is used.

Example 2-1 (Case 2-1): Time-Domain Bundling is not Used

When counting manner 2-1 is used, the invalid PDSCH has no corresponding HARQ-ACK bits in the HARQ-ACK codebook.

When counting manner 2-2 is used, the invalid PDSCH has corresponding HARQ-ACK bits in the HARQ-ACK codebook, and the HARQ-ACK bits are all set to NACK.

Example 2-2 (Case 2-2): Time-Domain Bundling is Used

Time-domain bundling herein can be understood as bundling across DAIs (which may further cross DCI boundary). That is, bundling is performed on every B adjacent DAIs/PDSCHs in a DAI counting/numbering order. When the number of DAIs/PDSCHs is less than B at the tail, bundling is performed based on remaining DAIs/PDSCHs. PDSCHs for bundling herein can form a PDSCH subset. B herein is a granularity of time-domain bundling. B is greater than or equal to 1 and may be specified by the protocol or configured based on higher-layer signaling.

For the DAI counting/numbering order, because each piece of DCI can schedule one or more PDSCHs, a PDSCH traversal dimension can be introduced based on the original DAI counting/numbering order. Specifically, the DAI counting/numbering order may be as follows: first, traversing one or more PDSCHs that are scheduled by a single piece of DCI (based on the scheduled/valid PDSCH scheduling order), then traversing DCIs for scheduling in one or more serving cells corresponding to a same PDCCH monitoring occasion (pointing to a specified UL slot/sub-slot; where traversing the serving cells may be based on cell indexes (Cell index)), and finally traversing PDCCH monitoring occasions (based on an order of starting moments).

It should be noted that the number of DAIs/PDSCHs corresponding to each piece of DCI can flexibly vary, and if time-domain bundling is limited to a PDSCH range scheduled by a single piece of DCI, the possibility of inconsistent understanding on the codebook size between the two sides may be resulted during the DCI missing detection.

When counting manner 2-1 is used, PDSCHs for time-domain bundling do not include an invalid PDSCH.

When counting manner 2-2 is used, either of the following processing manners (bundling manner 2-1 or bundling manner 2-2) may be used.

Bundling manner 2-1: The invalid PDSCH is included into an operation range of time-domain bundling.

In this case, PDSCHs in the PDSCH set/subset determined based on B all participate in the time-domain bundling operation. A decoding result corresponding to the invalid PDSCH may be assumed to be NACK or ACK.

Further, to avoid the impact of invalid PDSCHs being unable to be transmitted/received on HARQ-ACK feedback:

(1) when binary AND is used, the decoding result corresponding to the invalid PDSCH may be assumed to be ACK; and (2) when binary OR is used, the decoding result corresponding to the invalid PDSCH may be assumed to be NACK.

Bundling manner 2-2: The invalid PDSCH is excluded from an operation range of time-domain bundling.

In this case, only valid PDSCH in the PDSCH set/subset determined based on B participate in the time-domain bundling operation.

Alt scheme 3: DAI counting for every M scheduled PDSCHs scheduled by a single piece of DCI This DAI counting scheme can be briefly described as follows: The PDSCH set scheduled by a single piece of DCI can be divided into one or more PDSCH groups (PDSCH group) based on M. Each PDSCH group contains a maximum of M scheduled PDSCHs with consecutive numbers/indexes (PDSCH groups other than the last PDSCH group contain M PDSCHs with consecutive numbers/indexes, and the number of PDSCHs with consecutive numbers/indexes contained by the last PDSCH group is ≤M), and DAI counting is performed for the PDSCH group. M herein can be specified by the protocol or configured based on higher-layer signaling.

When M=MAX, Alt scheme 3 is Alt scheme 1, and when M=1, Alt scheme 3 is Alt scheme 2.

When 1<M<MAX, Alt scheme 3 serves as a compromise between Alt scheme 1 and Alt scheme 2. For division of PDSCH groups, either of the following manners (group division manner 1 or group division manner 2) may be used:

Group division manner 1: Scheduled PDSCHs are divided into PDSCH groups.

In this case, all scheduled PDSCHs scheduled by the DCI participate in PDSCH group division, regardless of whether it is a valid PDSCH or an invalid PDSCH.

Group division manner 2: Only valid PDSCHs are divided into PDSCH groups.

In this case, because invalid PDSCHs do not participate in PDSCH group division, there is no corresponding HARQ-ACK bits in the HARQ-ACK codebook.

When group division manner 1 is used, the scheduled PDSCH may be an invalid PDSCH. Assuming that when scheduled PDSCHs corresponding to a PDSCH group are invalid PDSCHs, the PDSCH group is an invalid PDSCH group; otherwise, the PDSCH group is a valid PDSCH group, and in this case, for DAI counting, either of the following manners (counting manner 3-1 or counting manner 3-2) may be used.

Counting manner 3-1: Invalid PDSCH groups are not included into the DAI counting.

The C-DAI indicated in the scheduling DCI corresponds to the 1st or last valid PDSCH group scheduled by this DCI; the T-DAI indicated in the scheduling DCI indicates DAI corresponding to the last valid PDSCH group that has been scheduled in the current PUCCH cell group and for which HARQ-ACK is fed back in a same UL slot/sub-slot, as of a current PDCCH monitoring occasion (including valid PDSCH groups scheduled in each serving cell corresponding to a current PUCCH cell group within the current PDCCH monitoring occasion). When no missing detection of scheduling DCI occurs, for next scheduling DCI for which corresponding HARQ-ACK is fed back in a same UL slot/sub-slot in a same PUCCH cell group of a same terminal, counting needs to be performed continuously based on DAI indicated by the scheduling DCI.

For example, assuming that the PUCCH cell group involves only a single serving cell and the terminal detects that DCI1 schedules three PDSCH groups, of which two are valid PDSCH groups, and assuming that the C-DAI indicated in DCI1 is 1, for the 1st valid PDSCH group, when no DCI missing detection occurs, the terminal expects that next DCI2 indicates a C-DAI of 3 (that is, the two valid PDSCH groups scheduled by DCI1 correspond to DAI=1 and DAI=2, respectively).

Counting manner 3-2: Invalid PDSCH groups are included into the DAI counting.

DAI counting is performed for each scheduled PDSCH group, regardless of whether it is a valid PDSCH group or an invalid PDSCH group.

It can be understood that the UE determines a DCI missing detection status based on one of the foregoing counting manners used and constructs a HARQ-ACK codebook accordingly.

The following describes bit setting/processing of the HARQ-ACK codebook based on whether time-domain bundling is used.

Example 3-1 (Case 3-1): Time-Domain Bundling is not Used

When counting manner 3-1 is used, the invalid PDSCH group does not have a corresponding HARQ-ACK bit in the HARQ-ACK codebook.

When counting manner 3-2 is used, the invalid PDSCH group has corresponding HARQ-ACK bits in the HARQ-ACK codebook, and the HARQ-ACK bits are all set to NACK.

For any counting manner, when an invalid PDSCH is included in the valid PDSCH group, the invalid PDSCH has corresponding HARQ-ACK bits in the HARQ-ACK codebook, and the HARQ-ACK bits are all set to NACK.

Example 3-2 (Case 3-2): Time-Domain Bundling is Used

It is assumed that the granularity of time-domain bundling is the adjacent B1 PDSCHs, that is, time-domain bundling is performed for (a maximum of) B1 PDSCHs. B1 herein is a granularity of time-domain bundling and may be specified by the protocol or configured based on higher-layer signaling.

Generally, the relation between M and B1 may be any one of the following:

Relation 1: M=B1.

In this case, the granularity of DAI counting is exactly the same as the granularity of time-domain bundling, that is, a PDSCH group corresponding to a single DAI just corresponds to a single bundling group, and then a correlation between DAI and codebook size may use the existing scheme in Rel-15/16, except that a value of the HARQ-ACK bit needs to be set based on a time-domain bundling operation.

Relation 2: M is an integer multiple of B1.

In this case, the PDSCH group corresponding to a single DAI is further divided into bundling groups, for example, each PDSCH group is divided into M/B1 bundling groups. When the number of PDSCHs contained in a PDSCH group is M, each bundling group obtained by dividing the PDSCH group contains adjacent B1 PDSCHs; when the number of PDSCHs contained in a PDSCH group is less than M (for example, when the number of PDSCHs scheduled by a specific piece of DCI is not an integral multiple of M, the number of PDSCHs contained in the last PDSCH group scheduled by the DCI may be less than M), the PDSCHs contained in this PDSCH group can be divided as evenly as possible into the bundling groups. In this case, the number of PDSCHs contained in some bundling groups may be less than B1.

Time-domain bundling is performed for the PDSCHs contained in each Bundling group.

Relation 3: B1 is an integer multiple of M.

Time-domain bundling is performed for several (for example, B1/M) PDSCH groups together, and DAIs corresponding to the PDSCH groups are adjacent to each other or consecutively counted.

Time-domain bundling herein can be understood as bundling across DAIs (which may further cross DCI boundary). That is, bundling is performed on every B1/M adjacent DAI/PDSCH groups in a DAI counting/numbering order. When the number of DAI/PDSCH groups is less than B1/M at the tail, bundling is performed based on remaining DAI/PDSCH groups. PDSCHs for bundling herein can form a PDSCH set or a bundling group. For the DAI counting/numbering order, because each piece of DCI can schedule one or more PDSCH groups, a PDSCH group traversal dimension can be introduced based on the original DAI counting/numbering order. Specifically, the DAI counting/numbering order may be as follows: first, traversing one or more PDSCH groups that are scheduled by a single piece of DCI (based on the foregoing group division manner and counting manner), then traversing DCIs for scheduling in one or more serving cells corresponding to a same PDCCH monitoring occasion (pointing to a specified UL slot/sub-slot; where traversing the serving cells may be based on cell indexes), and finally traversing PDCCH monitoring occasions (based on an order of starting moments).

When counting manner 3-2 is used, the invalid PDSCH group has corresponding HARQ-ACK bits in the HARQ-ACK codebook, and the HARQ-ACK bits are all set to NACK.

For any counting manner, the corresponding HARQ-ACK processing for the valid PDSCH group can be performed in either of the following manners (Bundling manner 3-1 or Bundling manner 3-2).

Bundling manner 3-1: Invalid PDSCHs are included into the operation range of time-domain bundling. In this case, all PDSCHs in the bundling group participate in the time-domain bundling operation. A decoding result corresponding to the invalid PDSCH may be assumed to be NACK or ACK.

Further, to avoid the impact of invalid PDSCHs being unable to be transmitted/received on HARQ-ACK feedback:

(1) when binary AND is used, the decoding result corresponding to the invalid PDSCH may be assumed to be ACK; and (2) when binary OR is used, the decoding result corresponding to the invalid PDSCH may be assumed to be NACK.

Bundling manner 3-2: The invalid PDSCH is excluded from an operation range of time-domain bundling.

Only valid PDSCHs in the bundling group participate in the time-domain bundling operation.

Referring to FIG. 4, an embodiment of this application provides a dynamic HARQ-ACK codebook processing apparatus, and the apparatus 400 includes:

a first determining module 401, configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used.

The scheduled PDSCHs include: valid PDSCH(s) or invalid PDSCH(s).

In an implementation of this application, the first determining module 401 is further configure to: in a case that the DAI counting manner includes performing DAI counting for each downlink control information DCI and time-domain bundling is not used, map the valid PDSCH(s) to HARQ-ACK bits in the dynamic HARQ-ACK codebook, or map all of the scheduled PDSCHs to HARQ-ACK bits in the dynamic HARQ-ACK codebook.

In an implementation of this application, the time-domain bundling manner includes one of the following:

(1) including invalid PDSCH(s) into an operation range of the time-domain bundling; and (2) excluding the invalid PDSCH(s) from the operation range of the time-domain bundling.

In an implementation of this application, a granularity or range of the time-domain bundling includes one of the following:

a PDSCH set scheduled by DCI; and

PDSCH subsets in the PDSCH set scheduled by DCI.

In an implementation of this application, in a case that the granularity or range of the time-domain bundling includes the PDSCH set scheduled by DCI, the PDSCH set is classified in one of the following manners:

regarding all the scheduled PDSCHs as a PDSCH set; and or, regarding all the valid PDSCHs as a PDSCH set.

In an implementation of this application, in a case that the granularity or range of the time-domain bundling includes the PDSCH subsets in the PDSCH set scheduled by DCI, the apparatus further includes: a first determining module, configured to determine the number of PDSCH subsets based on a size of a PDSCH subset; or determine a size of a PDSCH subset based on the number of PDSCH subsets.

In an implementation of this application, in a case that the granularity or range of the time-domain bundling includes the PDSCH subsets in the PDSCH set scheduled by DCI, the apparatus further includes: a second determining module, configured to determine a mapping relationship between the scheduled PDSCHs or valid PDSCHs and the PDSCH subsets.

In an implementation of this application, the mapping relationship includes any one of the following:

the 1st scheduled PDSCH or the 1st valid PDSCH corresponds to the 1st PDSCH in the 1st PDSCH subset, and remaining scheduled PDSCHs or remaining valid PDSCHs sequentially correspond to a current PDSCH subset or to a PDSCH subset after the current PDSCH subset; and the last scheduled PDSCH or the last valid PDSCH corresponds to the last PDSCH in the last PDSCH subset, and remaining scheduled PDSCHs or remaining valid PDSCHs sequentially correspond to a current PDSCH subset or to a PDSCH subset before the current PDSCH subset.

In an implementation of this application, the first determining module 401 is further configured to:

in a case that time-domain bundling is not used and the invalid PDSCH is not included into the DAI counting, skip mapping the invalid PDSCH to the HARQ-ACK bits in the dynamic HARQ-ACK codebook;

or, in a case that time-domain bundling is not used and the invalid PDSCH is included into the DAI counting, map the invalid PDSCH to the HARQ-ACK bits in the dynamic HARQ-ACK codebook.

In an implementation of this application, the first determining module 401 is further configured to: in a case that time-domain bundling is used and the DAI counting manner includes inclusion of the invalid PDSCH into the DAI counting, include the invalid PDSCH into the operation range of the time-domain bundling, or exclude the invalid PDSCH from the operation range of the time-domain bundling.

In an implementation of this application, the first determining module 401 is further configured to: in a case that, for division of the scheduled PDSCHs into PDSCH groups, the DAI counting manner includes no inclusion of an invalid PDSCH group in the PDSCH groups into the DAI counting and that time-domain bundling is not used, skip mapping the invalid PDSCH group in the PDSCH groups to the HARQ-ACK bits in the dynamic HARQ-ACK codebook;

or, in a case that, for division of the scheduled PDSCHs into PDSCH groups, time-domain bundling is not used and that the DAI counting manner includes inclusion of an invalid PDSCH group in the PDSCH groups into the DAI counting, map the invalid PDSCH group in the PDSCH groups to the HARQ-ACK bits in the dynamic HARQ-ACK codebook; where the HARQ-ACK bits are set to negative acknowledgement NACK.

Scheduled PDSCHs corresponding to the invalid PDSCH group are all invalid PDSCHs.

In an implementation of this application, the first determining module 401 is further configured to: in a case that, for division of the scheduled PDSCHs into PDSCH groups, the DAI counting manner includes performing DAI counting for each PDSCH group scheduled by a single piece of DCI, that a valid PDSCH group in the PDSCH groups includes an invalid PDSCH, and that time-domain bundling is not used, map the invalid PDSCH in the valid PDSCH group to the HARQ-ACK bits in the dynamic HARQ-ACK codebook; where the HARQ-ACK bits are set to NACK.

At least one scheduled PDSCH corresponding to the valid PDSCH group is a valid PDSCH.

In an implementation of this application, the first determining module 401 is further configured to: in a case that, for division of the scheduled PDSCHs into PDSCH groups, time-domain bundling is used and the DAI counting manner includes inclusion of an invalid PDSCH group into the DAI counting, map an invalid PDSCH group in the PDSCH groups to the HARQ-ACK bits in the dynamic HARQ-ACK codebook; where the HARQ-ACK bits are set to NACK.

In an implementation of this application, the first determining module 401 is further configured to: in a case that, for division of the scheduled PDSCHs into PDSCH groups, the DAI counting manner includes performing DAI counting for each PDSCH group scheduled by a single piece of DCI, and that time-domain bundling is used, include an invalid PDSCH in a valid PDSCH group in the PDSCH groups into the operation range of the time-domain bundling, or exclude an invalid PDSCH in a valid PDSCH group in the PDSCH groups from the operation range of the time-domain bundling.

In an implementation of this application, the apparatus further includes:

a receiving module, configured to receive a DAI indication from a network-side device, where the DAI indication includes any one of the following:

(1) the network-side device does not include the invalid PDSCH into the DAI counting;

(2) the network-side device includes the invalid PDSCH into the DAI counting;

(3) the network-side device does not include a PDSCH group into the DAI counting; and (4) the network-side device includes a PDSCH group into the DAI counting.

In a case that, for division of the scheduled PDSCHs into PDSCH groups or for division of valid PDSCHs into PDSCH groups, the PDSCH group includes a maximum of M scheduled PDSCHs with consecutive numbers or indexes or includes a maximum of adjacent valid PDSCHs in the M scheduled PDSCHs, M being greater than or equal to 1.

In an implementation of this application, in a case that the granularity or range of the time-domain bundling includes the PDSCH subsets in the PDSCH set scheduled by DCI, the PDSCH subset includes a maximum of N scheduled PDSCHs with consecutive numbers or indexes or includes a maximum of adjacent valid PDSCHs in the N scheduled PDSCHs; where N is equal to M, or M is an integer multiple of N, or N is an integer multiple of M.

The apparatus provided in this embodiment of this application is capable of implementing the processes implemented in the method embodiment shown in FIG. 2, with the same technical effects achieved. To avoid repetition, details are not described herein again.

Referring to FIG. 5, a dynamic HARQ-ACK codebook processing apparatus in an embodiment of this application is applied to a network-side device, and the apparatus 500 includes:

a second determining module 501, configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used.

The scheduled PDSCHs include: valid PDSCH(s) or invalid PDSCH(s).

In an implementation of this application, the apparatus 500 further includes:

a processing module configured to: in a case that at least one of scheduled PDSCHs is unable to be transmitted, perform DAI counting based on one or more of a DAI counting manner and whether time-domain bundling is used.

The scheduled PDSCHs include: valid PDSCH(s) or invalid PDSCH(s).

In an implementation of this application, the processing module is further configured to: in a case that the DAI counting manner includes performing DAI counting for each scheduled PDSCH, exclude the invalid PDSCH from the DAI counting or include the invalid PDSCH into the DAI counting.

In an implementation of this application, the processing module is further configured to: in a case that the DAI counting manner includes DAI counting for each piece of DCI-scheduled PDSCH group, exclude the PDSCH group from the DAI counting or include the PDSCH group into the DAI counting.

In a case that, for division of the scheduled PDSCHs into PDSCH groups or for division of valid PDSCHs into PDSCH groups, the PDSCH group includes a maximum of M scheduled PDSCHs with consecutive numbers or indexes or includes a maximum of adjacent valid PDSCHs in the M scheduled PDSCHs, M being greater than or equal to 1.

In an implementation of this application, a granularity or range of the time-domain bundling includes: in a case of a PDSCH subset of a PDSCH set scheduled by DCI, the PDSCH subset includes a maximum of N scheduled PDSCHs with consecutive numbers or indexes, or a maximum of adjacent valid PDSCHs of the N scheduled PDSCHs; where N is equal to M, or M is an integer multiple of N, or N is an integer multiple of M.

In an implementation of this application, the apparatus further includes:

a transmitting module configured to transmit a DAI indication to a terminal; where the DAI indication includes any one of the following:

(1) the network-side device does not include the invalid PDSCH into the DAI counting;

(2) the network-side device includes the invalid PDSCH into the DAI counting;

(3) the network-side device does not include a PDSCH group into the DAI counting; and (4) the network-side device includes a PDSCH group into the DAI counting.

The apparatus provided in this embodiment of this application is capable of implementing the processes implemented in the method embodiment shown in FIG. 3, with the same technical effects achieved. To avoid repetition, details are not described herein again.

An embodiment of this application further provides a terminal, including a processor and a communication interface, and the processor is configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used. The terminal embodiments correspond to the foregoing terminal-side method embodiments, and the implementation processes and implementations of the foregoing method embodiments can be applied to the terminal embodiments, with the same technical effects achieved.

Figure 6:
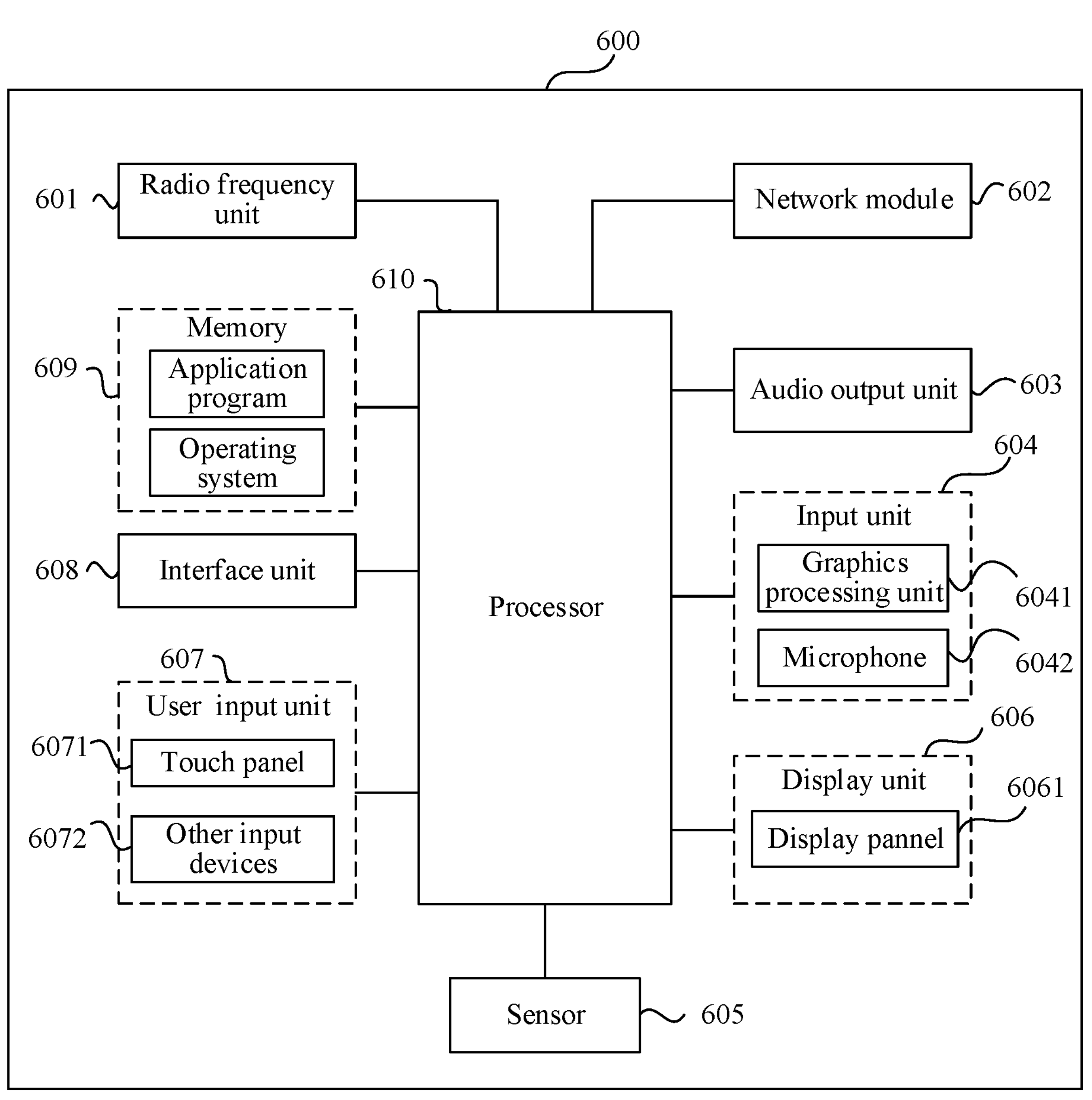
FIG. 6 is a schematic diagram of a terminal according to an embodiment of this application.

Specifically, FIG. 6 is a schematic structural diagram of hardware of a terminal for implementing the embodiments of this application. The terminal 600 includes but is not limited to at least part of components such as a radio frequency unit 601, a network module 602, an audio output unit 603, an input unit 604, a sensor 605, a display unit 606, a user input unit 607, an interface unit 608, a memory 609, and a processor 610.

Persons skilled in the art can understand that the terminal 600 may further include a power supply (for example, a battery) supplying power to the components, and the power supply may be logically connected to the processor 610 through a power management system. In this way, functions such as charge management, discharge management, and power consumption management are implemented by using the power management system. The structure of the terminal shown in FIG. 6 does not constitute any limitation on the terminal. The terminal may include more or fewer components than shown in the figure, or a combination of some components, or the components disposed differently. Details are not described herein again.

It can be understood that in this embodiment of this application, the input unit 604 may include a graphics processing unit (GPU) 6041 and a microphone 6042. The graphics processing unit 6041 processes image data of a still picture or video obtained by an image capture apparatus (such as a camera) in a video capture mode or an image capture mode. The display unit 606 may include a display panel 6061, and the display panel 6061 may be configured in a form of a liquid crystal display, an organic light-emitting diode, and the like. The user input unit 607 may include a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a function key (such as a volume control key or a power on/off key), a trackball, a mouse, a joystick, and the like. Details are not described herein.

In this embodiment of this application, the radio frequency unit 601 receives downlink data from a network-side device, and then sends the downlink data to the processor 610 for processing; and also sends uplink data to the network-side device. Generally, the radio frequency unit 601 includes but is not limited to an antenna, at least one amplifier, a transceiver, a coupler, a low noise amplifier, a duplexer, and the like.

The memory 609 may be configured to store software programs or instructions and various data. The memory 609 may include a program or instruction storage area and a data storage area. The program or instruction storage area may store an operating system, an application program or instruction required by at least one function (for example, a sound playback function or an image playback function), and the like. In addition, the memory 609 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another volatile solid-state storage device.

The processor 610 may include one or more processing units. Optionally, an application processor and a modem processor may be integrated in the processor 610. The application processor primarily processes an operating system, user interfaces, application programs or instructions, and the like. The modem processor primarily processes radio communication, for example, being a baseband processor. It can be understood that the modem processor may alternatively be not integrated in the processor 610.

In this embodiment of this application, the processor 610 is configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used.

In this embodiment of this application, the radio frequency unit 601 receives a DAI indication from a network-side device.

The DAI indication includes any one of the following:

the network-side device does not include the invalid PDSCH into the DAI counting;

the network-side device includes the invalid PDSCH into the DAI counting;

the network-side device does not include a PDSCH group into the DAI counting; and the network-side device includes a PDSCH group into the DAI counting.

In a case that, for division of the scheduled PDSCHs into PDSCH groups or for division of valid PDSCHs into PDSCH groups, the PDSCH group includes a maximum of M scheduled PDSCHs with consecutive numbers or indexes, M being greater than or equal to 1.

The terminal provided in this embodiment of this application is capable of implementing the processes implemented in the method embodiment shown in FIG. 2, with the same technical effects achieved. To avoid repetition, details are not described herein again.

An embodiment of this application further provides a network-side device, including a processor and a communication interface, and the processor is configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used. The network-side device embodiments correspond to the foregoing terminal-side method embodiments, and the implementation processes and implementations of the foregoing method embodiments can be applied to the network-side device embodiments, with the same technical effects achieved.

Figure 7:
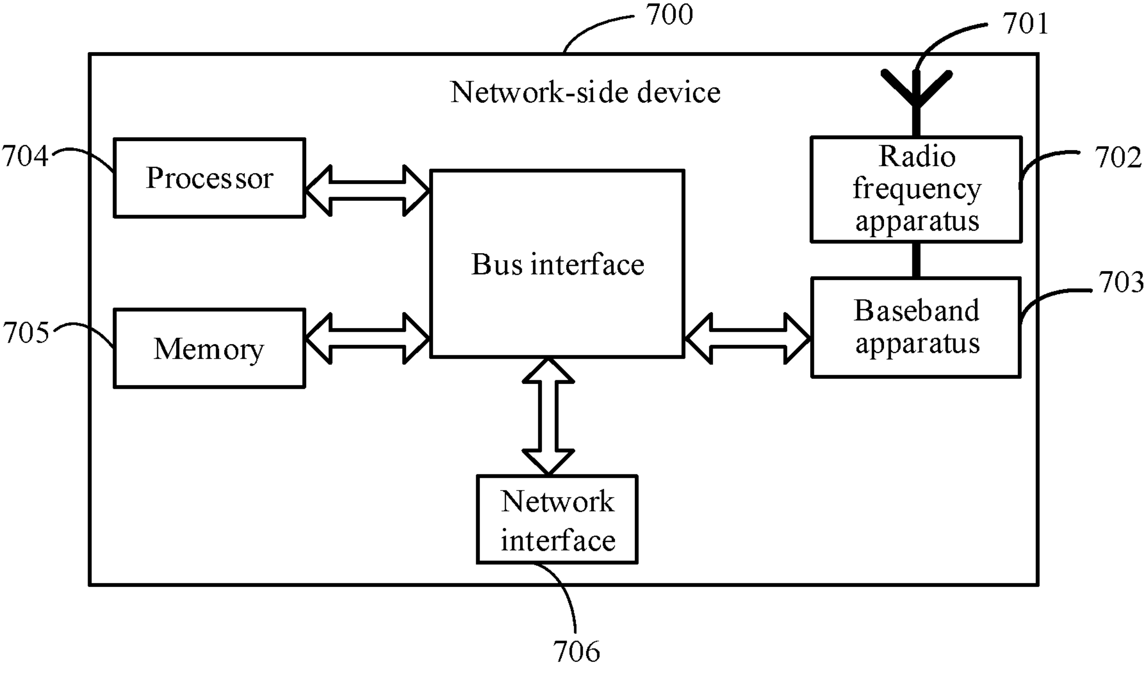
FIG. 7 is a schematic diagram of a network-side device according to an embodiment of this application.

Specifically, an embodiment of this application further provides a network-side device. As shown in FIG. 7, the network-side device 700 includes an antenna 701, a radio frequency apparatus 702, and a baseband apparatus 703. The antenna 701 is connected to the radio frequency apparatus 702. In an uplink direction, the radio frequency apparatus 702 receives information by using the antenna 701, and sends the received information to the baseband apparatus 703 for processing. In a downlink direction, the baseband apparatus 703 processes to-be-sent information, and sends the information to the radio frequency apparatus 702; and the radio frequency apparatus 702 processes the received information and then sends the information out by using the antenna 701.

The frequency band processing apparatus may be located in the baseband apparatus 703. The method performed by the network-side device in the foregoing embodiments may be implemented in the baseband apparatus 703, and the baseband apparatus 703 includes a processor 704 and a memory 705.

The baseband apparatus 703 may include, for example, at least one baseband board, where a plurality of chips are disposed on the baseband board. As shown in FIG. 7, one of the chips, for example, the processor 704, is connected to the memory 705, to invoke a program in the memory 705 to perform the operation of the network device shown in the foregoing method embodiments.

The baseband apparatus 703 may further include a network interface 706, configured to exchange information with the radio frequency apparatus 702, where the interface is, for example, a common public radio interface (CPRI).

Specifically, the network-side device in this embodiment of this application further includes: instructions or a program stored in the memory 705 and capable of running on the processor 704.

In this embodiment of this application, the processor 704 is configured to: in a case that at least one of scheduled PDSCHs is unable to be transmitted, determine a mapping relationship between HARQ-ACK bits in a dynamic HARQ-ACK codebook and the scheduled PDSCHs based on one or more of a DAI counting manner and whether time-domain bundling is used. The scheduled PDSCHs include: valid PDSCH(s) or invalid PDSCH(s).

In this embodiment of this application, the processor 704 is further configured to: perform DAI counting based on one or more of a DAI counting manner and whether time-domain bundling is used.

In this embodiment of this application, the radio frequency apparatus 702 is configured to send a DAI indication to a terminal.

The DAI indication includes any one of the following:

the network-side device does not include the invalid PDSCH into the DAI counting;

the network-side device includes the invalid PDSCH into the DAI counting;

the network-side device does not include a PDSCH group into the DAI counting; and the network-side device includes a PDSCH group into the DAI counting.

It can be understood that the processor 704 invokes the instructions or programs in the memory 705 to execute the method performed by the modules shown in FIG. 5, with the same technical effects achieved. To avoid repetition, details are not repeated herein.

An embodiment of this application further provides a computer program/program product, where the computer program/program product is stored in a non-volatile storage medium, and the computer program/program product is executed by at least one processor to implement the steps of the processing method shown in FIG. 2 or FIG. 3.

An embodiment of this application further provides a readable storage medium, where a program or an instruction is stored in the readable storage medium. When the program or the instruction is executed by a processor, the processes of the foregoing method embodiments shown in FIG. 2 or FIG. 3 are implemented, with the same technical effects achieved. To avoid repetition, details are not described herein again.

The processor is a processor in the terminal described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions to implement the foregoing method embodiments shown in FIG. 3, with the same technical effects achieved. To avoid repetition, details are not repeated herein.

It should be understood that the chip mentioned in the embodiments of this application may also be referred to as a system-level chip, a system chip, a chip system, a system-on-chip, or the like.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, a network device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A dynamic hybrid automatic repeat request acknowledgement HARQ-ACK codebook processing method, comprising:

in a case that there is a conflict between at least one of scheduled physical downlink shared channels PDSCHs scheduled by at least one piece of downlink control information DCI, and a semi-static uplink symbol, and the at least one of scheduled PDSCHs is unable to be transmitted, determining, by a terminal, a mapping relationship between HARQ-ACK bits in a dynamic HARQ-ACK codebook and the scheduled PDSCHs based on one or more of a downlink assignment index DAI counting manner and whether time-domain bundling is used;

wherein the step of determining a mapping relationship between HARQ-ACK bits in a dynamic HARQ-ACK codebook and the scheduled PDSCHs based on a DAI counting manner and whether time-domain bundling is used comprises:

in a case that the DAI counting manner comprises performing DAI counting for each DCI and time-domain bundling is not used, mapping all of the scheduled PDSCHs to HARQ-ACK bits in the dynamic HARQ-ACK codebook; or wherein in a case that the DAI counting manner comprises performing DAI counting for each DCI and time-domain bundling is used, the time-domain bundling manner comprises:

comprising all PDSCH(s) in the scheduled PDSCHs into an operation range of the time-domain bundling.

2. The method according to claim 1, wherein the number of HARQ-ACK bits corresponding to one or more PDSCHs scheduled by each DCI in the dynamic HARQ-ACK codebook is determined by the maximum configured number MAX of PDSCHs for multi-PDSCH DCIs across serving cells belonging to a same PUCCH cell group;

wherein each DCI corresponds to MAX positions in the dynamic HARQ-ACK codebook, and each position corresponds to a single PDSCH.

3. The method according to claim 2, wherein the mapping all of the scheduled PDSCHs to HARQ-ACK bits in the dynamic HARQ-ACK codebook comprises:

mapping N scheduled PDSCHs scheduled by one DCI to the beginning N positions of the MAX positions corresponding to the one DCI in the dynamic HARQ-ACK codebook one by one in a scheduling order.

4. The method according to claim 3, further comprising:

in a case that one position in N actually mapped positions in the MAX positions corresponding to the one DCI in the dynamic HARQ-ACK codebook is mapped to an invalid PDSCH, setting all HARQ-ACK bits corresponding to the one position to NACK, wherein the invalid PDSCH(s) is PDSCH(s) having conflict with the semi-static UL symbol.

5. The method according to claim 3, further comprising:

setting all HARQ-ACK bits corresponding to each of (MAX-N) unmapped positions in the MAX positions corresponding to the one DCI in the dynamic HARQ-ACK codebook to NACK.

6. The method according to claim 1, wherein a granularity or range of the time-domain bundling comprises one of the following:

a PDSCH set scheduled by DCI; wherein the PDSCH set is classified in a manner of regarding all the scheduled PDSCHs as a PDSCH set; and PDSCH subsets in the PDSCH set scheduled by DCI; wherein a size of a PDSCH subset is determined based on the number of PDSCH subsets, and the size of the PDSCH subset is based on configured by higher-layer signaling.

7. The method according to claim 6, wherein in a case that the granularity or range of the time-domain bundling comprises the PDSCH subsets in the PDSCH set scheduled by DCI, the method further comprises:

determining a mapping relationship between the scheduled PDSCHs or valid PDSCHs in the scheduled PDSCHs and the PDSCH subsets;

wherein the mapping relationship comprises any one of the following:

the 1st scheduled PDSCH or the 1st valid PDSCH corresponds to the 1st PDSCH in the 1st PDSCH subset, and remaining scheduled PDSCHs or remaining valid PDSCHs sequentially correspond to a current PDSCH subset or to a PDSCH subset after the current PDSCH subset; and the last scheduled PDSCH or the last valid PDSCH corresponds to the last PDSCH in the last PDSCH subset, and remaining scheduled PDSCHs or remaining valid PDSCHs sequentially correspond to a current PDSCH subset or to a PDSCH subset before the current PDSCH subset; wherein the valid PDSCH(s) is PDSCH(s) having no conflict with the semi-static UL symbol.

8. The method according to claim 6, further comprising at least one of the following:

when at least one invalid PDSCH is present in a given bundling group, and binary AND is used, assuming a decoding result corresponding to the invalid PDSCH to be ACK, and setting HARQ-ACK bits for the bundling group in the dynamic HARQ-ACK codebook based on a bundling output, wherein the invalid PDSCH(s) is PDSCH(s) having conflict with the semi-static UL symbol;

when no scheduled PDSCH/valid PDSCH is mapped for a given bundling group, setting all HARQ-ACK bits of the given bundling group in the dynamic HARQ-ACK codebook to NACK, wherein the valid PDSCH(s) is PDSCH(s) having no conflict with the semi-static UL symbol;

wherein the given bundling group is the PDSCH set, or, the given bundling group is one of the PDSCH subsets.

9. The method according to claim 1, wherein at least one scheduled PDSCH has no conflict with a semi-static UL symbol.

10. A dynamic HARQ-ACK codebook processing method, comprising:

in a case that there is a conflict between at least one of scheduled PDSCHs scheduled by at least one piece of downlink control information DCI, and a semi-static uplink symbol, and the at least one of scheduled PDSCHs is unable to be transmitted, determining, by a network-side device, a mapping relationship between HARQ-ACK bits in a dynamic HARQ-ACK codebook and the scheduled PDSCHs based on one or more of a DAI counting manner and whether time-domain bundling is used;

wherein the step of determining a mapping relationship between HARQ-ACK bits in a dynamic HARQ-ACK codebook and the scheduled PDSCHs based on a DAI counting manner and whether time-domain bundling is used comprises:

in a case that the DAI counting manner comprises performing DAI counting for each DCI and time-domain bundling is not used, mapping all of the scheduled PDSCHs to HARQ-ACK bits in the dynamic HARQ-ACK codebook; or wherein in a case that the DAI counting manner comprises performing DAI counting for each DCI and time-domain bundling is used, the time-domain bundling manner comprises:

comprising all PDSCH(s) in the scheduled PDSCHs into an operation range of the time-domain bundling.

11. The method according to claim 10, wherein the number of HARQ-ACK bits corresponding to one or more PDSCHs scheduled by each DCI in the dynamic HARQ-ACK codebook is determined by the maximum configured number MAX of PDSCHs for multi-PDSCH DCIs across serving cells belonging to a same PUCCH cell group;

wherein each DCI corresponds to MAX positions in the dynamic HARQ-ACK codebook, and each position corresponds to a single PDSCH.

12. The method according to claim 11, wherein the mapping all of the scheduled PDSCHs to HARQ-ACK bits in the dynamic HARQ-ACK codebook comprises:

mapping N scheduled PDSCHs scheduled by one DCI to the beginning N positions of the MAX positions corresponding to the one DCI in the dynamic HARQ-ACK codebook one by one in a scheduling order.

13. The method according to claim 12, further comprising:

in a case that one position in N actually mapped positions in the MAX positions corresponding to the one DCI in the dynamic HARQ-ACK codebook is mapped to an invalid PDSCH, setting all HARQ-ACK bits corresponding to the one position to NACK, wherein the invalid PDSCH(s) is PDSCH(s) having conflict with the semi-static UL symbol.

14. The method according to claim 12, further comprising:

setting all HARQ-ACK bits corresponding to each of (MAX-N) unmapped positions in the MAX positions corresponding to the one DCI in the dynamic HARQ-ACK codebook to NACK.

15. A network-side device, comprising a processor, a memory, and a program stored in the memory and capable of running on the processor, wherein when the program is executed by the processor, the steps of the method according to claim 10 are implemented.

16. A terminal, comprising a processor, a memory, and a program stored in the memory and capable of running on the processor, wherein when the program is executed by the processor, following steps are implemented:

in a case that there is a conflict between at least one of scheduled physical downlink shared channels PDSCHs scheduled by at least one piece of downlink control information DCI, and a semi-static uplink symbol, and the at least one of scheduled PDSCHs is unable to be transmitted, determining a mapping relationship between HARQ-ACK bits in a dynamic HARQ-ACK codebook and the scheduled PDSCHs based on one or more of a downlink assignment index DAI counting manner and whether time-domain bundling is used;

wherein the step of determining a mapping relationship between HARQ-ACK bits in a dynamic HARQ-ACK codebook and the scheduled PDSCHs based on a DAI counting manner and whether time-domain bundling is used comprises:

in a case that the DAI counting manner comprises performing DAI counting for each DCI and time-domain bundling is not used, mapping all of the scheduled PDSCHs to HARQ-ACK bits in the dynamic HARQ-ACK codebook; or wherein in a case that the DAI counting manner comprises performing DAI counting for each DCI and time-domain bundling is used, the time-domain bundling manner comprises:

comprising all PDSCH(s) in the scheduled PDSCHs into an operation range of the time-domain bundling.

17. The terminal according to claim 16, wherein the number of HARQ-ACK bits corresponding to one or more PDSCHs scheduled by each DCI in the dynamic HARQ- ACK codebook is determined by the maximum configured number MAX of PDSCHs for multi-PDSCH DCIs across serving cells belonging to a same PUCCH cell group;

wherein each DCI corresponds to MAX positions in the dynamic HARQ-ACK codebook, and each position corresponds to a single PDSCH.

18. The terminal according to claim 17, wherein the mapping all of the scheduled PDSCHs to HARQ-ACK bits in the dynamic HARQ-ACK codebook comprises:

mapping N scheduled PDSCHs scheduled by one DCI to the beginning N positions of the MAX positions corresponding to the one DCI in the dynamic HARQ-ACK codebook one by one in a scheduling order.

19. The terminal according to claim 18, wherein the steps further comprise:

in a case that one position in N actually mapped positions in the MAX positions corresponding to the one DCI in the dynamic HARQ-ACK codebook is mapped to an invalid PDSCH, setting all HARQ-ACK bits corresponding to the one position to NACK, wherein the invalid PDSCH(s) is PDSCH(s) having conflict with the semi-static UL symbol.

20. The terminal according to claim 18, wherein the steps further comprise:

setting all HARQ-ACK bits corresponding to each of (MAX-N) unmapped positions in the MAX positions corresponding to the one DCI in the dynamic HARQ-ACK codebook to NACK.

* * * * *